(12) United States Patent
Sato et al.

(10) Patent No.: US 7,796,124 B2
(45) Date of Patent: Sep. 14, 2010

(54) INPUT DEVICE AND ELECTRONIC APPARATUS

(75) Inventors: Tadamitsu Sato, Fukushima-ken (JP); Shuzo Ono, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 995 days.

(21) Appl. No.: 11/552,448

(22) Filed: Oct. 24, 2006

(65) Prior Publication Data

US 2007/0165006 A1   Jul. 19, 2007

(30) Foreign Application Priority Data

Oct. 27, 2005   (JP)   ............... 2005-312447

(51) Int. Cl.
*G06F 3/041* (2006.01)
*G06F 3/044* (2006.01)
(52) U.S. Cl. ................... 345/174; 345/173; 345/169; 178/18.06
(58) Field of Classification Search ......... 345/156–184, 345/173; 178/18.01–18.11
See application file for complete search history.

(56) References Cited

U.S. PATENT DOCUMENTS

| 5,748,185 | A  | * | 5/1998  | Stephan et al. | 345/173 |
| 6,239,790 | B1 | * | 5/2001  | Martinelli et al. | 345/174 |
| 7,002,557 | B2 | * | 2/2006  | Iizuka et al. | 345/173 |
| 2003/0067447 | A1 | * | 4/2003  | Geaghan et al. | 345/173 |
| 2005/0179668 | A1 | * | 8/2005  | Edwards | 345/173 |
| 2006/0279550 | A1 | * | 12/2006 | Lii et al. | 345/173 |

FOREIGN PATENT DOCUMENTS

| JP | 07-044306 | 2/1995 |
| JP | 3195724 | 6/2001 |

* cited by examiner

*Primary Examiner*—David L Lewis
(74) *Attorney, Agent, or Firm*—Brinks Hofer Gilson & Lione

(57) ABSTRACT

An input device and electronic apparatus are provided. The input device includes a detecting region that is operative to detect a change in capacitance between electrodes. The detecting region extends from an image display region that displays an image and has a predetermined area to a non-display region that is adjacent to the image display region and does not display the image.

11 Claims, 6 Drawing Sheets

INPUT DEVICE AND ELECTRONIC APPARATUS

This patent document claims the benefit of Japanese Patent Application No. 2005-312447 filed Oct. 27, 2005, which is hereby incorporated by reference.

BACKGROUND

1. Field

The present embodiments relate to an input device and an electronic apparatus using the input device.

2. Related Art

In various electronic apparatuses such as mobile telephones or personal computers, an image display region having a liquid crystal display device is formed. Generally, an electronic apparatus has a tablet input device formed on the front surface of a liquid crystal display device. Information corresponding to an indication image is input by bringing a finger into contact with the indication image while confirming indication images displayed on an image display region.

The electronic apparatus having the tablet input device formed on the image display region is suitable for an apparatus that displays only indication images, for example, an ATM apparatus, on an image display region or a large-sized apparatus having a wide image display region and a wide space capable of displaying the other information using the remaining region other than an image display region for displaying an indication image.

Alternatively, in a small-sized electronic apparatus including an image display region having a small area, for example, a mobile apparatus, a small-sized personal computer or a small-sized game apparatus, when a region that displays an indication image is formed in an image display region, the remaining region of the image display region narrows and information other than the indication image is not easily displayed.

Patent Document 1 and Patent Document 2 disclose an electronic apparatus that has an input operation unit provided on a frame disposed at the periphery of an image display region. In such an electronic apparatus, it is possible to operate the input operation units arranged on the frame while confirming display information of an image display device and to display various kinds of information on the image display region over a large area.

[Patent Document 1] Japanese Unexamined Patent Application Publication No. 7-44306

[Patent Document 2] Japanese Patent No. 3195724

As disclosed in Patent Document 1 and Patent Document 2, when the input operation unit is formed on the frame disposed at the periphery of the image display region, the input operation unit which has a large area and allows an operation using a finger need be formed on the frame disposed at the periphery of the image display region. Accordingly, these cases are hard to apply to a small-sized electronic apparatus.

Accordingly, an input device capable of ensuring a wide information display region in a central portion of an image display region and detecting an operation position of a finger with certainty is desired.

SUMMARY

In one embodiment, an input device includes a detecting region that can detect a change in capacitance between electrodes. The detecting region is disposed to extend from an image display region that displays information by an image and has a predetermined area to a non-display region which is adjacent to the image display region and does not display the image.

For example, the detecting region having the electrodes may be formed on a resin sheet.

In one embodiment, the resin sheet is formed on a front surface of a display device which configures the image display region and the detecting region may be formed at a position overlapping at least one of an edge and a corner of the display device and a position which deviates from the display device.

In another embodiment, an electronic apparatus includes a display device; a support body which surrounds the periphery of the display device; and a transparent cover plate which is disposed on a front surface of the display device, wherein the resin sheet is interposed between the display device and the cover plate.

The detecting region is operative to detect a change in capacitance and extends from the image display region and the non-display region adjacent thereto. Accordingly, it is possible to operate a portion which extends from the image display region to the non-display region using the finger to allow an input operation while viewing information displayed on the image display region. Thus, although the area of the image display region is small or the area of the non-display region is small, it is possible to recognize the operation using the finger with certainty.

For example, in the electronic apparatus, an indication image overlapping the detecting region may be displayed on at least one of an edge or a corner of the display device and the indication image is viewed with naked eyes through the resin sheet.

In the above-described configuration, when the indication image has a small area and is displayed in a restricted region such as the edge or the corner of the image display region, it is possible to allow an operation input with certainty by operating a portion that extends from the image display region and the non-display region using the finger in a region in which the indication image is displayed. Accordingly, in the image display region, it is possible to widen the area of the remaining region in which the indication image is not displayed and to easily display various kinds of information in the remaining region.

In one embodiment, an indication display is provided at a position adjacent to an edge or a corner of the display device on the outside of the display device.

In this embodiment, when the area of a peripheral region that deviates from the image display region is small and the indication display is provided in the narrow peripheral region, it is possible to input information with certainty by operating a portion from the indication region to the image display region using the finger.

In one embodiment, the resin sheet extends to a position separated from the display device and the other operation region that detects a change in capacitance between the electrodes is formed on the resin sheet at a position separated from the display device.

For example, the detecting region which extends from the image display region to the non-display region and the other operation region separated from the image display region is disposed on the resin sheet and the number of components is reduced. Accordingly, it is possible to allow various operation inputs.

According to one exemplary embodiment, it is possible to detect the operation using the finger with certainty even in the electronic apparatus in which the area of the image display region is small or the area of the non-display region adjacent to the image display region is small.

DETAILED DESCRIPTION

Figure 1:
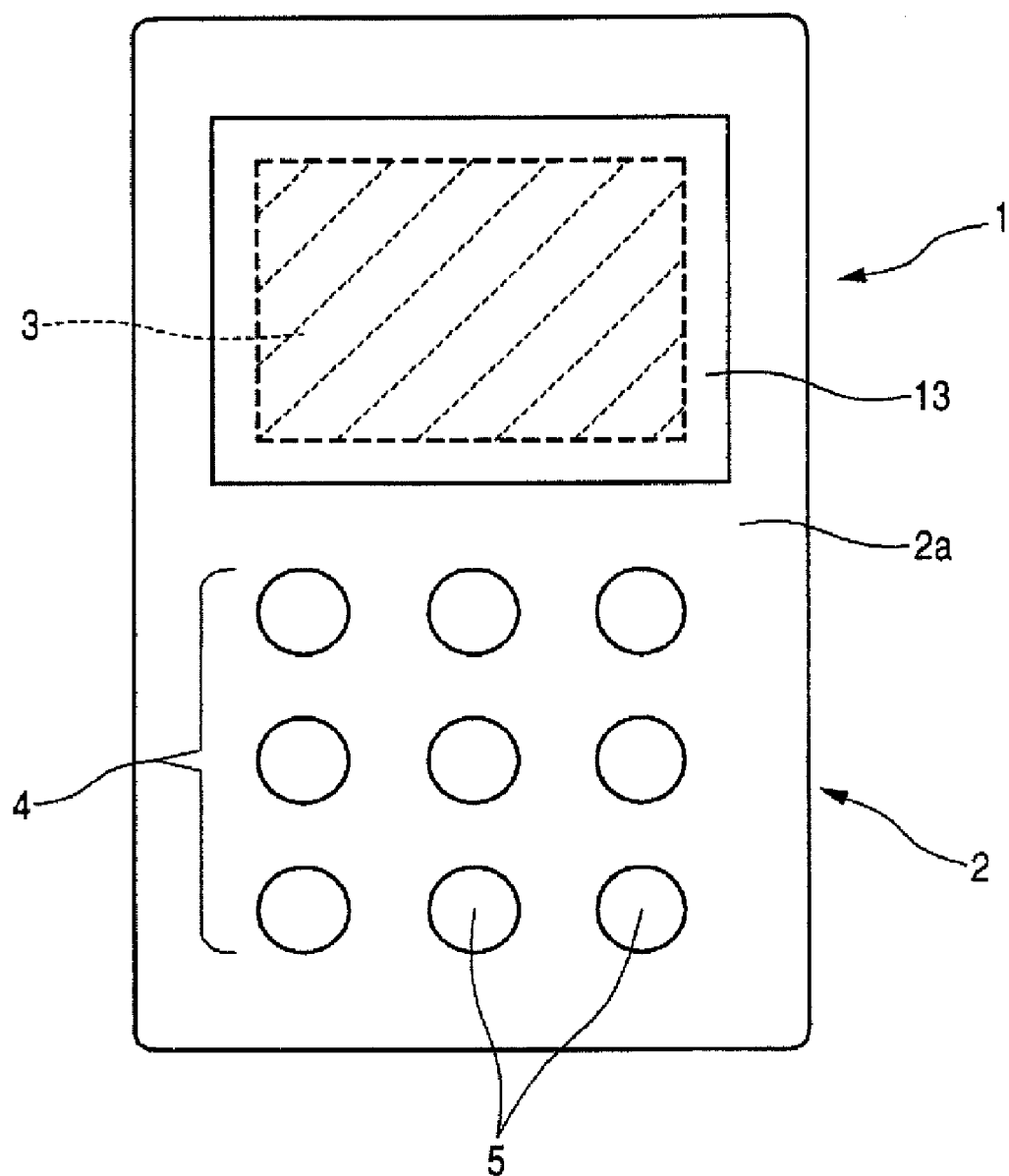
FIG. 1 is a front view that illustrates an electronic apparatus according to a first embodiment.

In one embodiment, the electronic apparatus 1, as shown in FIG. 1, is a small-sized mobile apparatus such as a mobile telephone, a game device, a small-sized personal computer or a small-sized audio device including a hard disc device or a flash memory.

The electronic apparatus 1 shown in FIG. 1 has a casing body 2 made of synthetic resin. On a front surface 2a of the casing body, an image display region 3 having a predetermined area is provided at the upper side of the drawing and an operation region 4 is provided at the side lower than the image display region 3.

A plurality of operation input units 5 are provided in the operation region 4. The operation input units 5 include a plurality of push buttons which separately operate and switch elements which operate by pressing the operation input units 5 of the push buttons are provided in the casing body 2. In the operation region 4, a detecting pad that detects a change in capacitance and detects a touch position of a conductor such as a finger as coordinate information may be provided in the casing body 2 or, alternatively, both the detecting pad and the operation input units of the push buttons may be provided.

Figure 2:
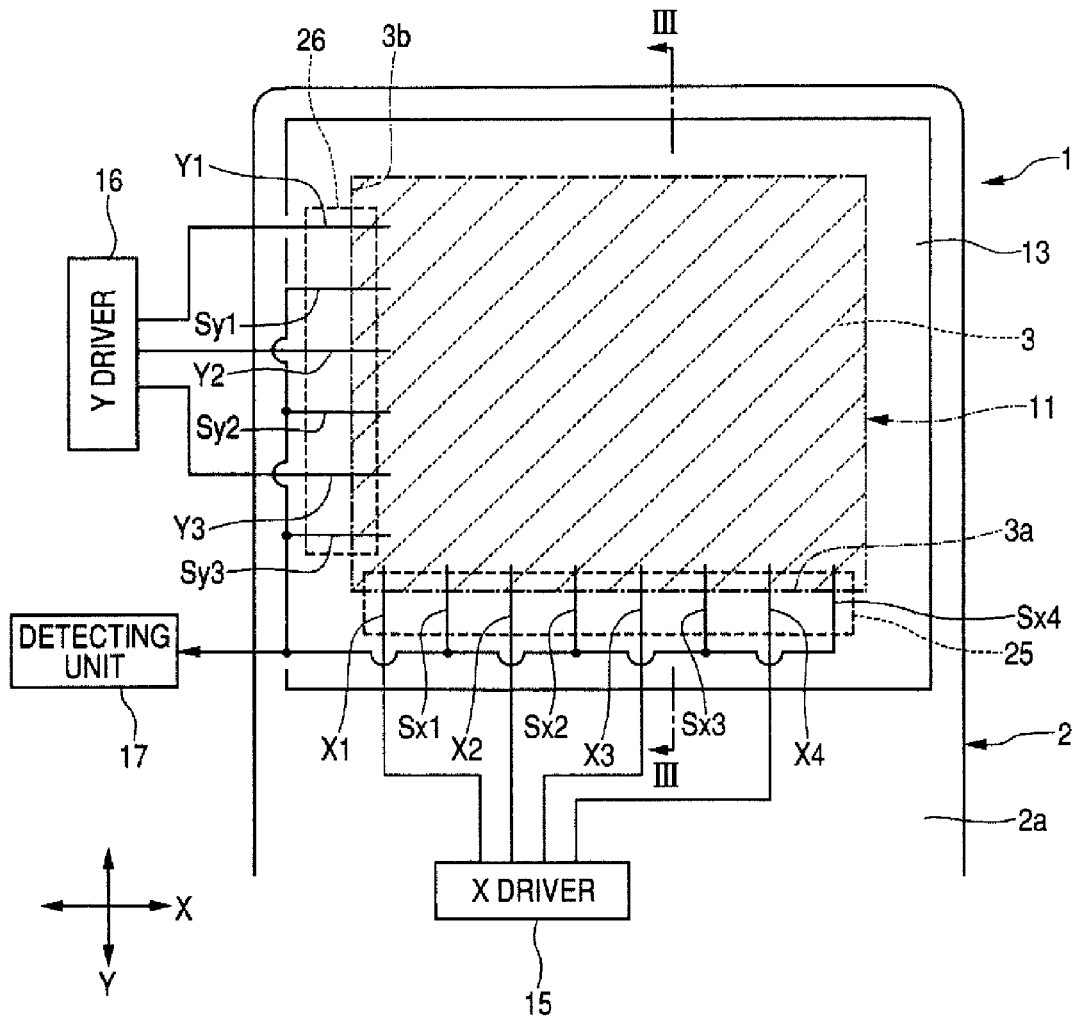
FIG. 2 is a view that illustrates the configuration of an input device provided in the electronic apparatus according to the first embodiment.

In FIG. 1 and FIG. 2, the image display region 3 is hatched by dotted lines so as to be distinguished from the other region. In the front surface 2a of the casing body 2, a region which is located at the periphery of the image display region 3, except the image display region 3, is a non-display region.

Figure 3:
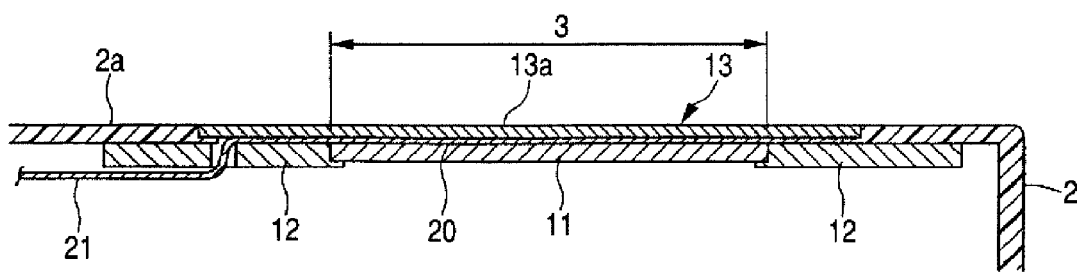
FIG. 3 is a cross-sectional view taken along line III-III of FIG. 2.

As shown in the cross-sectional view of FIG. 3, a display device 11 which configures the image display region 3 is provided in the front surface 2a of the casing body 2. This display device 11 can freely display a still image or a moving image and may be, for example, a liquid crystal display panel or a plasma display panel.

As shown in FIG. 3, the peripheral portion of the display device 11 is held by a support body 12. The support body 12 is made of a synthetic resin material. In this embodiment, the support body 12 is independent of the casing body 2. The support body 12 is fixed to the inner surface of the casing body 2. The support body 12 may be integrally formed with the casing body 2. A rectangular cover plate 13 is formed on the front surface 2a of the casing body 2. The cover plate 13 is transparent and may be a transparent resin plate or a glass plate.

As shown in FIG. 3, the front surface 13a of the cover plate 13 and the front surface 2a of the casing body 2 are the same surface. As shown in FIG. 1 and FIG. 2, the cover plate 13 has an area that is slightly larger than that of the display device 11. The display device 11 is positioned in the central portion of the cover plate 13. The support body 12 is positioned at the periphery of the cover plate 13. Accordingly, in the front surface 2a of the casing body 2, the display device 11 and the support body 12 are positioned in the vicinity thereof and can be viewed with naked eyes by seeing the cover plate 13. A region in which the display surface of the display device 11 can be viewed through the cover plate 13 is the image display region 3 and a region in which the support body 12 can be viewed through the cover plate 13 is the non-display region.

Alternatively, the area of a window formed in the casing body 2 may be equal to that of the display device 11 and a portion adjacent to the display device 11 may be covered with the casing body 2. In this case, the casing body 2 is positioned in the non-display region.

As shown in FIG. 3, an input device includes a resin sheet 20 formed on the front surfaces of the display device 11 and the support body 12 and the inner surface of the cover plate 13. The resin sheet 20 has substantially the same area as the cover plate 13 and the entire front surface of the display device 11 and the front surface of the support body 12 are covered with the resin sheet 20. Accordingly, the resin sheet 20 is transparent.

FIG. 2 shows electrodes formed on the resin sheet 20 as the input device by solid lines. In FIG. 2, although an X driver 15, a Y driver 16 and a detecting unit 17 are externally protruded from the casing body 2, the X driver 15, the Y driver 16 and the detecting unit 17 are formed in the casing body 2. Lead wires which lead from the electrodes formed on the resin sheet 20 are formed on an extension 21 which is integrally formed on the resin sheet 20, as shown in FIG. 3, and the X driver 15, the Y driver 16 and the detecting unit 17 are connected to the electrodes through the extension 21.

As shown in FIG. 2, X electrodes X1, X2, X3 and X4 are formed on the resin sheet 20 in parallel at a predetermined interval. X-side detecting electrodes Sx1, Sx2, Sx3 and Sx4 are formed between the X electrodes. The detecting electrodes Sx1, Sx2, Sx3 and Sx4 are parallel to the X electrodes X1, X2, X3 and X4 and the X electrodes and the detecting electrodes are arranged at the same interval. The X electrodes X1, X2, X3 and X4 and the X-side detecting electrodes Sx1, Sx2, Sx3 and Sx4 may be formed on the same surface of the resin sheet 20 or, alternatively, on the front and rear surfaces of the resin sheet 20 separately.

The X electrodes X1, X2, X3 and X4 and the X-side detecting electrodes Sx1, Sx2, Sx3 and Sx4 pass through an edge line 3a of the image display region 8 and extend from a region overlapping the edge of the image display region 3 to the non-display region which deviates from the image display region 3. A region in which the X electrodes and the X-side detecting electrodes face each other is a first detecting region 25. The first detecting region 25 extends from a position (position overlapping the edge of the display device 11) overlapping the edge (region from the edge line 3a to a position inwardly separated therefrom by a predetermined width) of the image display region 3 to the non-display region.

As shown in FIG. 2, Y electrodes Y1, Y2 and Y3 are formed on the resin sheet 20 in parallel at a predetermined interval. Y-side detecting electrodes Sy1, Sy2 and Sy3 are formed between the Y electrodes. The Y electrodes and the Y-side detecting electrodes are parallel to one another and the interval therebetween is uniform. The Y electrodes Y1, Y2 and Y3 and the Y-side detecting electrodes Sy1, Sy2 and Sy3 may be formed on the same surface of the resin sheet 20 or the Y electrodes and the Y-side detecting electrodes may be formed on the front surface and rear surface of the resin sheet 20, for example, respectively.

The Y electrodes Y1, Y2 and Y3 and the Y-side detecting electrodes Sy1, Sy2 and Sy3 pass an edge line 3b of the image display region 8 to extend from a region overlapping the edge of the image display region 3 to the non-display region adjacent thereto. A region in which the Y electrodes and the Y-side detecting electrodes face each other is a second detecting region 26. The second detecting region 26 extends from a position (position overlapping the edge of the display device 11) overlapping the edge (region from the edge line 3b to a position inwardly separated therefrom by a predetermined width) of the image display region 3 to the non-display region.

As shown in FIG. 2, the X electrodes X1, X2, X3 and X4 are connected to the X driver 15. The Y electrodes Y1, Y2 and Y3 are connected to the Y driver 16. The X-side detecting electrodes Sx1, Sx2, Sx3 and Sx4 and the Y-side detecting electrodes Sy1, Sy2 and Sy3 are connected to the detecting unit 17.

In one embodiment, the input device includes the resin sheet 20, the X electrodes X1, X2, X3 and X4, the Y electrodes Y1, Y2 and Y3, the X-side detecting electrodes Sx1, Sx2, Sx3 and Sx4, the Y-side detecting electrodes Sy1, Sy2 and Sy3, the X driver 15, the Y driver 16 and the detecting unit 17.

In this embodiment, voltages are sequentially applied to the X electrodes X1, X2, X3 and X4 by the X driver 15 and, as a result, charges are sequentially provided to the X electrodes X1, X2, X3 and X4. In the front surface 13a of the cover plate 13, when a finger which is the conductor touches any one position of the first detecting region 25, capacitance is created between the finger and the X-side detecting electrode in addition to the capacitance between the X electrode and the X-side detecting electrode. As a result, the capacitance is reduced and the output is detected by the detecting unit 17 through the X-side detecting electrodes Sx1, Sx2, Sx3 and Sx4. An unshown control unit can recognize which position of the first detecting region 25 is in contact with the finger as X-directional coordinate position information, from a timing representing which of the X electrodes X1, X2, X3 and X4 is applied with the voltage and a detected output obtained from the X-side detecting electrodes Sx1, Sx2, Sx3 and Sx4.

The voltages are sequentially applied to the Y electrodes Y1, Y2 and Y3 by the Y driver 16 and, as a result, charges are sequentially provided to the Y electrodes Y1, Y2 and Y3. At this time, the control unit can recognize which position of the second detecting region 26 is in contact with the finger as Y-directional coordinate position information, from a timing representing which of the Y electrodes Y1, Y2 and Y3 is provided with the charges and a detected output is obtained from the Y-side detecting electrodes Sy1, Sy2 and Sy3.

As shown in FIG. 2, the first detecting region 25 extends from the position overlapping the edge of the image display region 3 to the non-display region. Accordingly, when the finger touches the portion which extends from the image display region 3 to the non-display region, the X-directional touch position is recognized. The same is true in the second detecting region 26. Accordingly, although the electronic apparatus 1 has a small size and the image display region 3 has a small area, it is possible to detect whether the finger touches the portion which extends from the image display region 3 to the non-display region using the first detecting region 25 or the second detecting region 26 with high precision.

Figure 4:
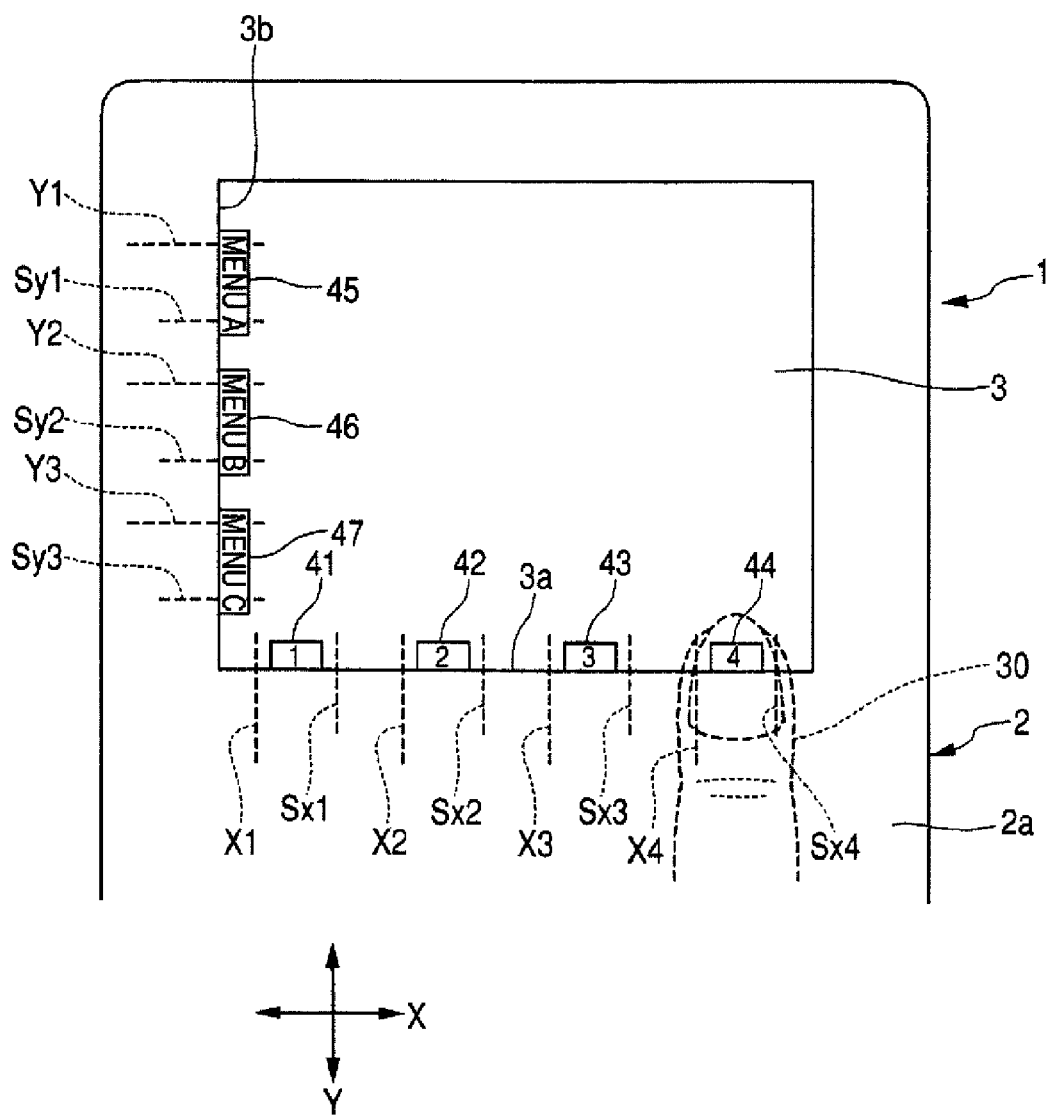
FIG. 4 is a view showing an example of displaying indication images in an image display region in the electronic apparatus according to the first embodiment.

FIG. 4 shows an example of the display in the image display region 3 of the electronic apparatus 1. In the example shown in FIG. 4, by the display operation of the display device 11, small indication images 41, 42, 43 and 44 are displayed at the inside of the edge line 3a which extends in the X direction of the image display region 3 and small indication images 45, 46 and 47 are displayed at the inside of the edge line 3b which extends in the Y direction of the image display region 3. The areas of the indication images 41, 42, 43, 44, 45, 46 and 47 are sufficiently smaller than that of the finger 30. Accordingly, the remaining region except the central portion of the image display region 3 is widened. For example, a still image or a moving image, other than the indication images, is displayed on the remaining region.

In this embodiment, for example, the area of the first detecting region 25 is larger than those of the indication images 41, 42, 43 and 44 and the area of the second detecting region 26 is larger than those of the indication images 45, 46 and 47.

When operation input is allowed based on indication information of any one of the indication images 41 to 47, the finger touches any one of the indication images 41 to 47. In another embodiment, when the finger touches both the image display region 3 and the non-display region over the edge line 3a of the image display region 3, it is possible to detect the X-directional coordinate position of the portion with which the finger is brought into contact by the first detecting region 25 having a sufficient width. As a result, it is possible to recognize which information of the indication images 41, 42, 43 and 44 is input. The same is true in the input of the indication images 45, 46 and 47. For example, when the finger touches a portion over the edge line 3b, it is possible to detect the touch position of the finger by the second detecting region 26 having the large area and to recognize which information of the indication images 45, 46 and 47 is input.

In one embodiment, the areas of the indication images 41 to 47 are small. However, it is possible to detect the touch position of the finger with certainty and maintain a wide display region in the central portion of the image display region 3.

In the example shown in FIG. 4, the indication images 41, 42, 43 and 44 are arranged along the edge line 3a of the image display region 3 at an interval and the indication images 45, 46 and 47 are arranged along the edge line 3b of the image display region 3 at an interval. In an alternate embodiment, in addition to the display of the indication images or independent of the display of the indication images, indication images are displayed at any ones of four corners of the image display region 3 and the first detecting region 25 and the second detecting region 26 is disposed such that the touch of the finger is detected in the corners.

Figure 5:
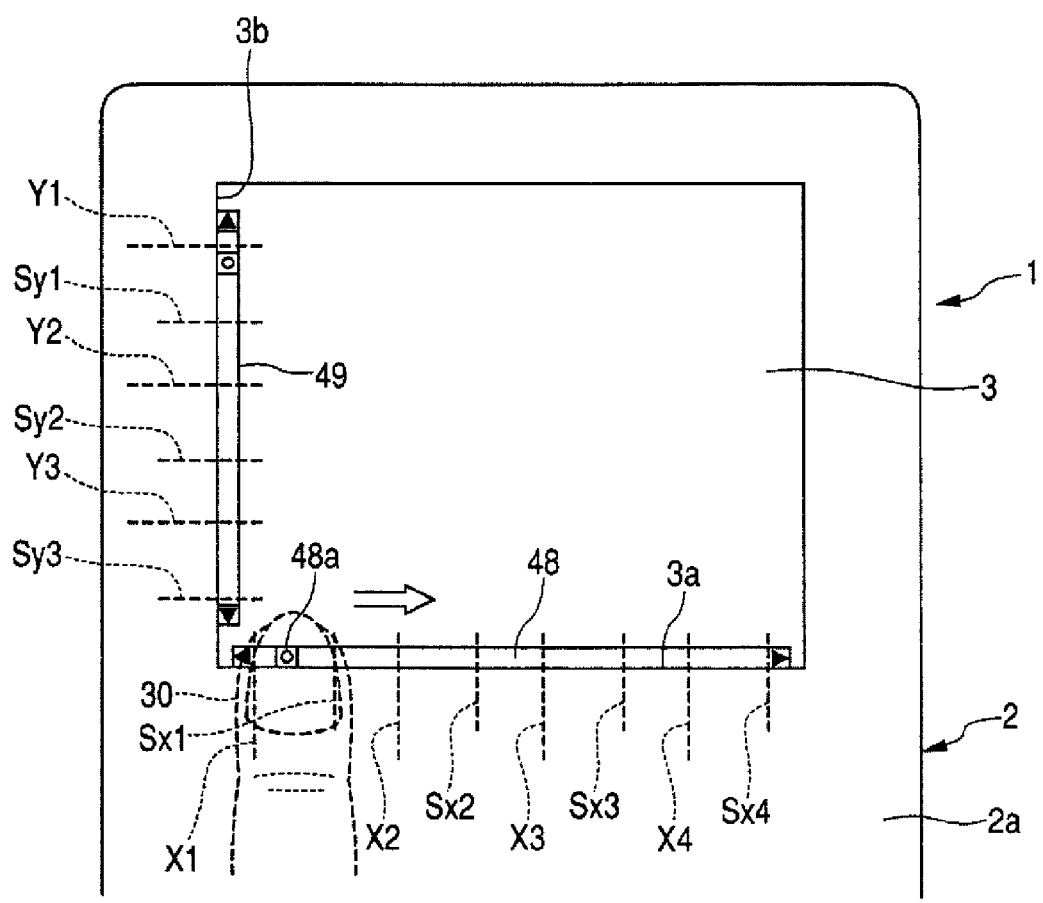
FIG. 5 is a view showing another example of displaying indication images in the image display region in the electronic apparatus according to the first embodiment.

FIG. 5 is a view showing another example of displaying indication images in the image display region 3 by the display device 11.

In one embodiment, the first detection region 25 continuously detects the touch position of the finger as the X-directional coordinate position and the second detecting region 26 continuously detects the touch position of the finger as the Y-directional coordinate position. Accordingly, it is possible to allow continuous coordinate inputs along the edge line 3a and the edge line 3b of the image display device 3.

In the embodiment shown in FIG. 5, in the image display region 3, a cursor is displayed along the edge line 3a as an indication image 48 and a cursor is displayed along the edge line 3b as an indication image 49. For example, when the finger 30 touches a cursor mark 48a of the indication image 48 and the finger 30 moves in a right direction, it is possible to continuously move the cursor mark 48a in the right direction. For example, it is possible to scroll information displayed in the remaining region except the central portion of the image display region 3 in the right direction by the input operation. When the finger 30 touches the display position of the cursor mark 48a, the tapping of the finger, that is, the touch/separation of the finger, is continuously performed at a high speed and the finger touches the cursor mark 48a and moved. The control unit may recognize the tapping as the movement of the cursor mark 48a.

In another embodiment, the above-described operation is performed when the indication image 49 and the cursor display extend in a vertical direction.

In this embodiment, the indication image 48 and the indication image 49 are displayed in narrow regions along the edge line 3a and the edge line 3b of the image display region 3. The indication images 48 and 49 are displayed in the narrow regions. The first detecting region 25 and the second detecting region 26 have an area that is larger than the indication images 48 and 49. The touch and the movement of the finger is detected by the first detecting region 25 and the second detecting region 26 having the large areas with high precision, by bringing the finger 30 into contact with the image display region 3 and the non-display region. Since the indication images 48 and 49 are displayed in the narrow regions, it is possible to widen the remaining region, for example, the central region of the image display region 3 and to display various kinds of information in the remaining region.

Figure 6:
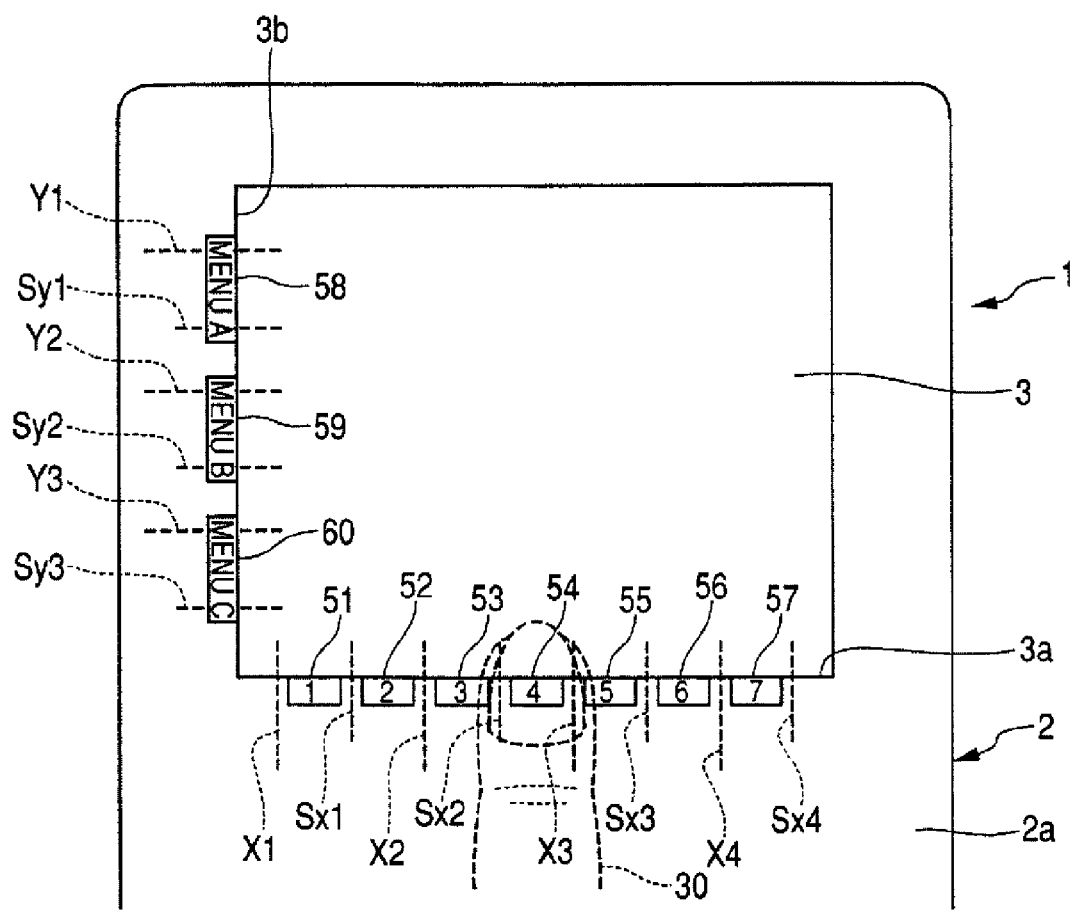
FIG. 6 is a partial front view showing an electronic apparatus according to a second embodiment.

FIG. 6 is an enlarged front view that illustrates an electronic apparatus 100 according to a second embodiment.

The input device provided in the electronic apparatus 100 is similar to that shown in FIG. 2 and FIG. 3. For example, the first detecting region 25 is formed from the image display region 3 to the non-display region and the second detecting region 26 is formed from the image display region 3 to the non-display region.

In the non-display region located at the outside of the edge line 3a that extends in the X direction of the image display region 3, indication displays 51, 52, 53, 54, 55, 56 and 57 are fixed displays and are provided at positions that are in contact with the edge line 3a or adjacent to the edge line 3a. Similarly, in the non-display region located at the outside of the edge line 3b that extends in the Y direction of the image display region 3, indication displays 58, 59 and 60 are fixed displays and are provided at positions that are in contact with the edge line 3b or adjacent to the edge line 3b. The indication displays 51 to 60 are provided on the front surface of the support body 12 shown in FIG. 3 by printing. The area of the region to which the indication displays 51 to 60 are provided is sufficiently smaller than those of the first detecting region 25 and the second detecting region 26.

In this embodiment, when any one of the indication displays 51 to 57 is operated, the finger touches the image display region 3 and the non-display region, because the indication display is small. The touch position is detected by the first detecting region 25 having the sufficient area and which information of the indication display is input is recognized with certainty. The same is true even when any one of the indication displays 58 to 60 is operated.

In this embodiment, although the indication displays 51 to 60 are formed in the narrow regions along the edge lines 3a and 3b in the non-display region located at the image display region 3, the touch position of the finger is detected by the first detecting region 25 or the second detecting region 26 with high precision. Accordingly, the indication displays 51 to 60 can be disposed in the peripheral portion of the image display region 3 with a small area and a small-sized electronic apparatus can be easily configured.

The indication displays 51 to 60 which are the fixed displays and the indication images in the image display region 3 shown in FIG. 4 or FIG. 5 are combined.

Figure 7:
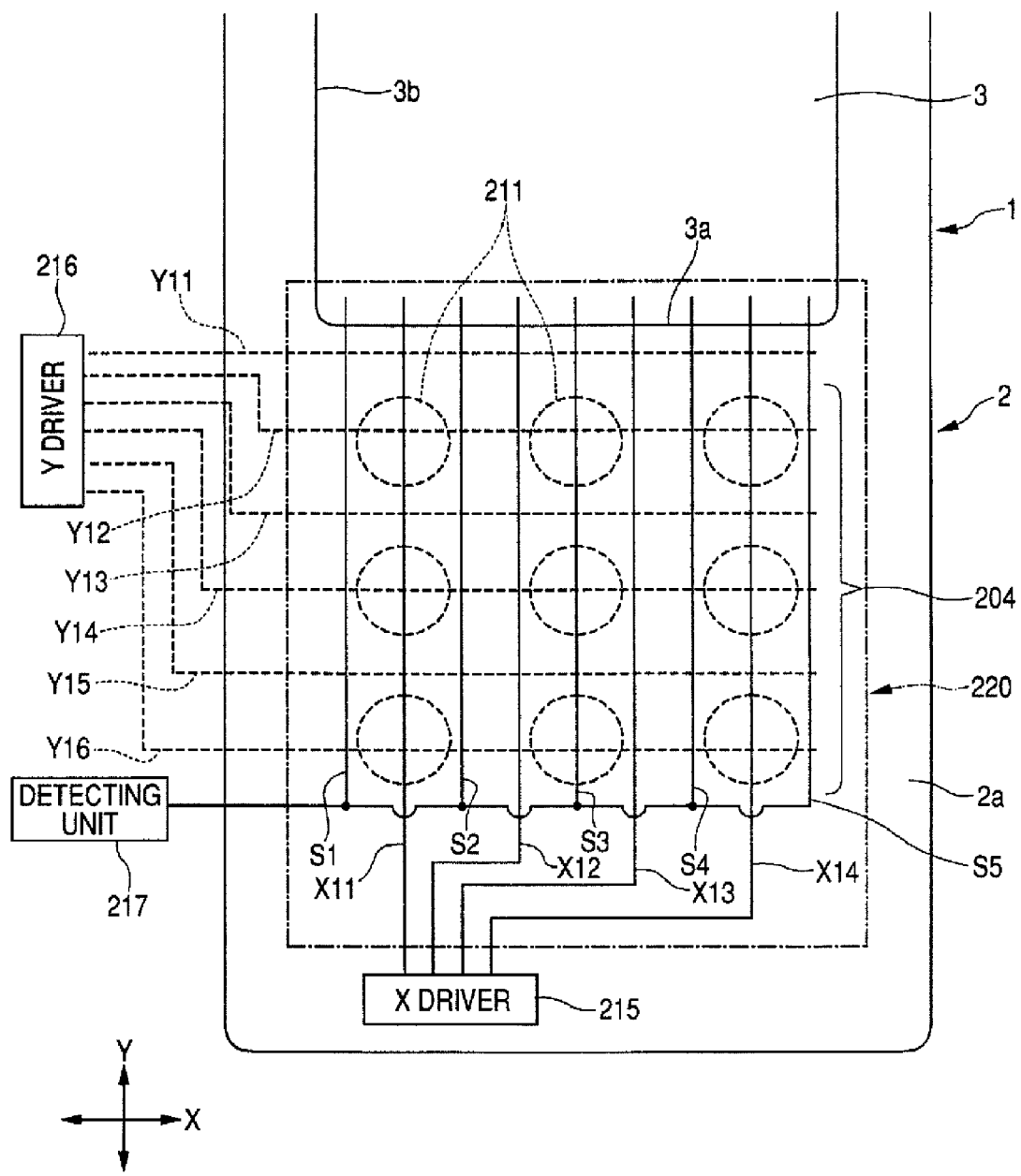
FIG. 7 is a view showing the configuration of an input device provided in an electronic apparatus according to a third embodiment.

FIG. 7 is a partial enlarged front view showing an electronic apparatus according to a third embodiment.

In the electronic apparatus 200, a resin sheet 220 which configures the input device is formed in the front surface 2a of the casing body 2 with a large area and a portion of the resin sheet 220 is positioned in the image display region 3 over the edge line 3a of the image display region 3 and the rest of the resin sheet 220 extends to the other operation region 204 positioned at the lower side of the image display region 3.

On the resin sheet 220, X electrodes X11, X12, X13 and X14 and detecting electrodes S1, S2, S3, S4 and S5 extend in parallel to one another in the Y direction. The X electrodes and the detecting electrodes are formed on one surface of the resin sheet 220. Y electrodes Y11, Y12, Y13, Y14, Y15 and Y16 extend on one surface of the resin sheet 220 in parallel to one another in the X direction. The X electrodes are connected to an X driver 215, the Y electrodes are connected to a Y driver 216 and the detecting electrodes are connected to a detecting unit 217.

The X electrodes X11, X12, X13 and X14 and the detecting electrodes S1, S2, S3, S4 and S5 extend to positions overlapping the inside of the image display region 3.

In the input device, voltages are sequentially applied to the X electrodes and the Y electrodes. When the finger touches any position of the front surface 2a of the casing body 2, the position is recognized on an X-Y coordinate. Even when the finger touches a portion adjacent to the edge line 3a of the image display region 3, the touch position is recognized as coordinate information. Accordingly, as shown in FIG. 4 or FIG. 5, in the image display region 3, when the indication images to 41 to 44 or the indication image 48 are displayed along the inside of the edge line 3a, it is possible to input information corresponding to the indication image by bringing the finger into contact with the portion which extends from the image display region 3 to the non-display region.

Since the touch position of the finger is recognized even in an operation region 204, it is possible to allow various operation inputs even in the operation region 204. For example, when key input portions 211 are printed and displayed on the front surface 2a of the casing body 2, it is possible to recognize which of the key input portions 211 is in contact with the finger by the coordinate detection of the input device. Alternatively, pressing switches are provided in the key input portions 211 in addition to the input device using the resin sheet 220.

In the third embodiment, since the detecting regions formed from the image display region 3 to the non-display region and the other operation region 204 are configured as a common input device, it is possible to reduce the number of components.

Although the X electrodes, the Y electrodes and the detecting electrodes are formed on the resin sheet and the voltages are sequentially applied to the X electrodes and the Y electrodes to detect a change in capacitance based on the output of the detecting electrodes in the input devices according to the embodiments, the input device may be embodied in any suitable configuration of the embodiments as long as the capacitance is detected. For example, X electrodes, Y electrodes and earth electrodes are included and changes in capacitance between the X electrodes and the earth electrodes and changes in capacitance between the Y electrodes and the earth electrodes may be detected.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. An input device comprising:
a detecting region that is operative to detect a change in capacitance between electrodes,
wherein the detecting region extends from an image display region that displays an image and has a predetermined area to a non-display region that is adjacent to the image display region and does not display the image,
wherein the detecting region has at least two electrodes and is formed on a resin sheet, the resin sheet extends to a position overlapping the image display region and to an operation region outside of the display region, the detecting region and the operation region being controlled and detected by a same driver, and
wherein the detecting region is disposed only over a periphery of the image display region and does not reach to the central portion of the image display region.

2. The input device according to claim 1, wherein the resin sheet is on a front surface of a display device that configures the image display region, and the detecting region is at a position overlapping an edge of the display device and a position that deviates from the display device.

3. The input device according to claim 1, wherein the resin sheet is on a front surface of a display device that configures the image display region, and the detecting region is at a position overlapping a corner of the display device and a position that deviates from the display device.

4. The input device according to claim 1, wherein the resin sheet is on a front surface of a display device that configures the image display region, and the detecting region is at a position overlapping both a edge and a corner of the display device and a position that deviates from the display device.

5. An electronic apparatus comprising:
a display device;
a support body that surrounds the periphery of the display device;
a transparent cover plate that is disposed on a front surface of the display device; and
a detecting region that has at least two electrodes and is formed on a resin sheet,
wherein the resin sheet is interposed between the display device and the cover plate,
wherein the resin sheet extends to a position overlapping an image display region and to an operation region outside of the display region, the detecting region and the operation region being controlled and detected by a same driver, and
wherein the detecting region is disposed only over a periphery of the image display region and does not reach to the central portion of the image display region.

6. The electronic apparatus according to claim 3, wherein the resin sheet is on a front surface of the display device, and the detecting region is at a position overlapping an edge of the display device and a position that deviates from the display device.

7. The electronic apparatus according to claim 3, wherein the resin sheet is on a front surface of a display device that configures the image display region, and the detecting region is at a position overlapping a corner of the display device and a position that deviates from the display device.

8. The electronic apparatus according to claim 3, wherein the resin sheet is on a front surface of a display device that configures the image display region, and the detecting region is at a position overlapping both a edge and a corner of the display device and a position that deviates from the display device.

9. The electronic apparatus according to claim 3, wherein an indication image overlapping the detecting region is displayed on at least one of an edge and a corner of the display device and the indication image is viewable through the resin sheet.

10. The electronic apparatus according to claim 3, wherein an indication display is provided at a position adjacent to an edge or a corner of the display device on the outside of the display device.

11. The electronic apparatus according to claim 3, wherein the resin sheet extends to a position separated from the display device and the operation region that is operative to detect a change in capacitance between the electrodes is formed on the resin sheet at a position separated from the display device.

* * * * *